United States Patent
Jung

[19]

[11] Patent Number: 5,931,876
[45] Date of Patent: Aug. 3, 1999

[54] TRACKING CONTROL CIRCUIT FOR AUTOMATIC GUIDE VEHICLE

[75] Inventor: Sung-Il Jung, Suwon, Rep. of Korea

[73] Assignee: Samsung Electronics Co., Ltd., Kyungki-Do, Rep. of Korea

[21] Appl. No.: 08/872,735

[22] Filed: Jun. 11, 1997

[30] Foreign Application Priority Data

Jun. 19, 1996 [KR] Rep. of Korea ............... 96-22414

[51] Int. Cl.⁶ ........................................... B62D 5/20
[52] U.S. Cl. .................. 701/23; 318/587; 180/167
[58] Field of Search .................. 701/23, 24, 25; 324/329; 318/587; 180/167, 168

[56] References Cited

U.S. PATENT DOCUMENTS

| | | | |
|---|---|---|---|
| 4,160,488 | 7/1979 | Blakesless | 180/168 |
| 4,742,283 | 5/1988 | Bolger et al. | 318/587 |
| 4,855,656 | 8/1989 | Saitoh et al. | 318/587 |
| 4,864,207 | 9/1989 | Miura et al. | 318/587 |

FOREIGN PATENT DOCUMENTS 2 104 686  3/1983  United Kingdom.

*Primary Examiner*—Tan Q. Nguyen
*Attorney, Agent, or Firm*—Sughrue, Mion, Zinn, Macpeak & Seas, PLLC

[57] ABSTRACT

A tracking control circuit for directly controlling the tracking (i.e., the steering) of an automatic guide vehicle (AGV) without utilizing a central processing unit (CPU) for control. The circuit controls the tracking of the AGV by comparing a first induced voltage with a second induced voltage to sense the tracking state (i.e., whether the AGV is veering right or left of the appropriate path), and then providing to a servo interface board either a voltage obtained by subtracting a reference voltage from the first induced voltage or a voltage obtained by subtracting the second induced voltage from the reference voltage. Which voltage is provided is determined in accordance with the sensed result of the tracking state.

15 Claims, 3 Drawing Sheets

TRACKING CONTROL CIRCUIT FOR AUTOMATIC GUIDE VEHICLE

BACKGROUND OF THE INVENTION

1. Field of the Invention

The present invention relates to a tracking (or steering) control circuit for an automatic guide vehicle (AGV). More particularly, it relates to a tracking control circuit for controlling the tracking of an AGV by an electromagnetic induction system.

This tracking control circuit for an automatic guide vehicle is based on Korean Patent Application No. 96-22414 which is incorporated herein by reference for all purposes.

2. Description of the Prior Art

An AGV is a load carrying vehicle that automatically follows a predetermined path. At an early stage of the AGV art, an optical guiding system, guiding the AGV's movement by applying a colored tape (often white tape) on a ground surface, has been used. However, if the colored tapes are polluted, there is a disadvantage that tracking of the AGV can not be adjusted due to the inability of a light-receiving section of an optical sensor to receive light reflected from the tape. Also, a guiding system using application of a magnetic tape has been used, however, analogous tape pollution problems may occur with such a system.

To solve the above-mentioned problem, an electromagnetic guiding system has been disclosed, which follows a predetermined path by sensing the intensity of an electromagnetic waves produced by a buried electric cable. As shown in FIG. 1, the cable 1 is buried under the ground surface, and a pair of induction coil sensors 2 for sensing the intensity of the electromagnetic wave are provided on the left and right sides of the buried cable 1, at a predetermined distance "a" from the buried cable. Accordingly, the tracking of the AGV is controlled by sensing the electromagnetic waves created by an alternating current flowing through the burial cable. A voltage level induced in one of the induction coils 2 has a characteristic that is inversely proportional to the distance between the cable 1 and the coil, such as that shown in FIG. 2.

When the electromagnetic guiding system is operating, however, the tracking control is achieved in a central processing unit (CPU) by repeatedly detecting a voltage difference at predetermined intervals between left and right induction coils (the voltage difference being dependent on the relative position of the induction coils with respect to the buried cable), and controlling the speed of left and right wheels of the AGV utilizing the detected value of the voltage difference and the speed of the AGV's movement.

However, the conventional tracking control system has the drawbacks that the processing time causes delayed due to heavy calculation requirement of the CPU, and that data must necessarily be converted into a format receivable by the CPU.

SUMMARY OF THE INVENTION

The present invention has been devised to solve the aforementioned drawbacks. It is an object of the present invention to provide a tracking control circuit which can directly adjust the tracking of an AGV utilizing a reference voltage and voltages outputted from sensors for sensing electromagnetic waves produced by a buried cable.

In order to achieve the above object, the present invention provides a tracking control circuit for use in an AGV to control the tracking of the AGV using sensors, wherein the sensors are equipped in the right and left sides of the AGV to straddle a buried cable. The sensors sense voltages induced from the buried cable when the AGV is being driven.

The tracking control circuit according to the present invention has a first comparing means for comparing a first induced voltage provided from one of the sensors equipped in the left side of the AGV with a second induced voltage provided from one of the sensors equipped in the right side of the AGV, and for outputting a first switching control signal if the first induced voltage is higher than the second induced voltage. The circuit further contains a second comparing means for comparing the first induced voltage with the second induced voltage, and for outputting a second switching control signal if said first induced voltage is lower than said second induced voltage.

The circuit also has a first and second switching means. The first switching means is for being switched by said second switching control signal to transmit said first induced voltage therethrough. The second switching means is for being switched by said first switching control signal to transmit said second induced voltage therethrough.

Additionally, the circuit has a third and fourth switching means. The third switching means is for selecting, in accordance with said first and second switching control signals, either the voltage transmitted through one of said first and second switching means or a predetermined reference voltage. The fourth switching means is for selecting, in accordance with said first and second switching control signals, either the voltage transmitted through one of said first and second switching means or said predetermined reference voltage. To calculate a tracking control signal, the circuit has a subtraction means for subtracting the voltage selected by said fourth switching means from the voltage selected by said third switching means to provide the tracking control signal for tracking control.

BRIEF DESCRIPTION OF THE DRAWINGS

The above object, and other features and advantages of the present invention will become more apparent by describing the preferred embodiment thereof with reference to the accompanying drawings, in which.

DETAILED DESCRIPTION OF THE PREFERRED EMBODIMENT

Figure 1:
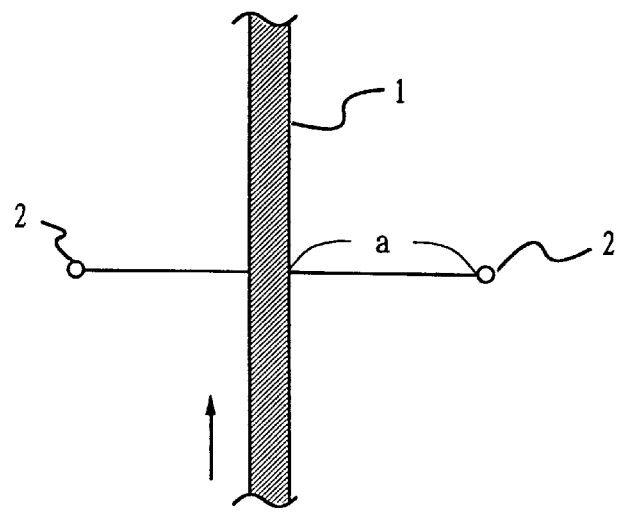
FIG. 1 is a view showing the relationship between induction coil sensors and a buried cable for guiding an AGV.
Figure 2:
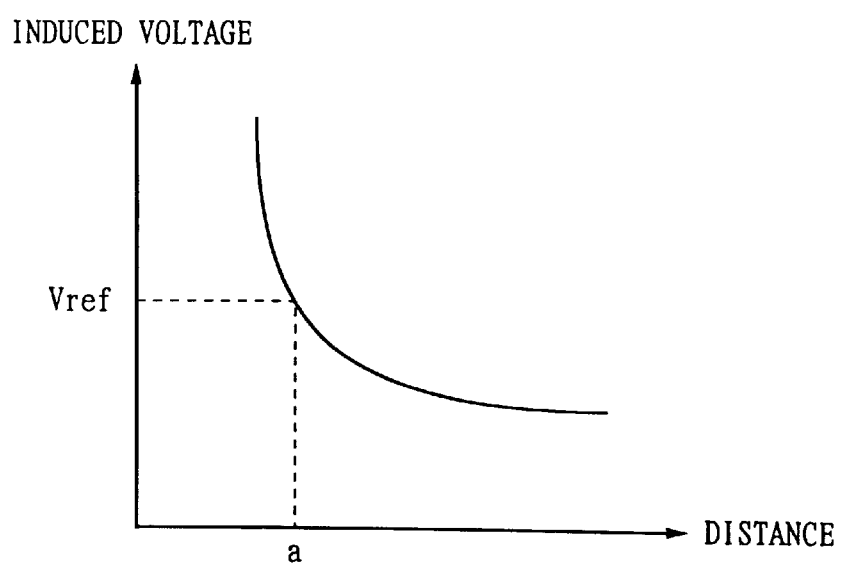
FIG. 2 is a view showing the relationship between induced voltage and the distance of an induction coil from the buried cable.
Figure 3:
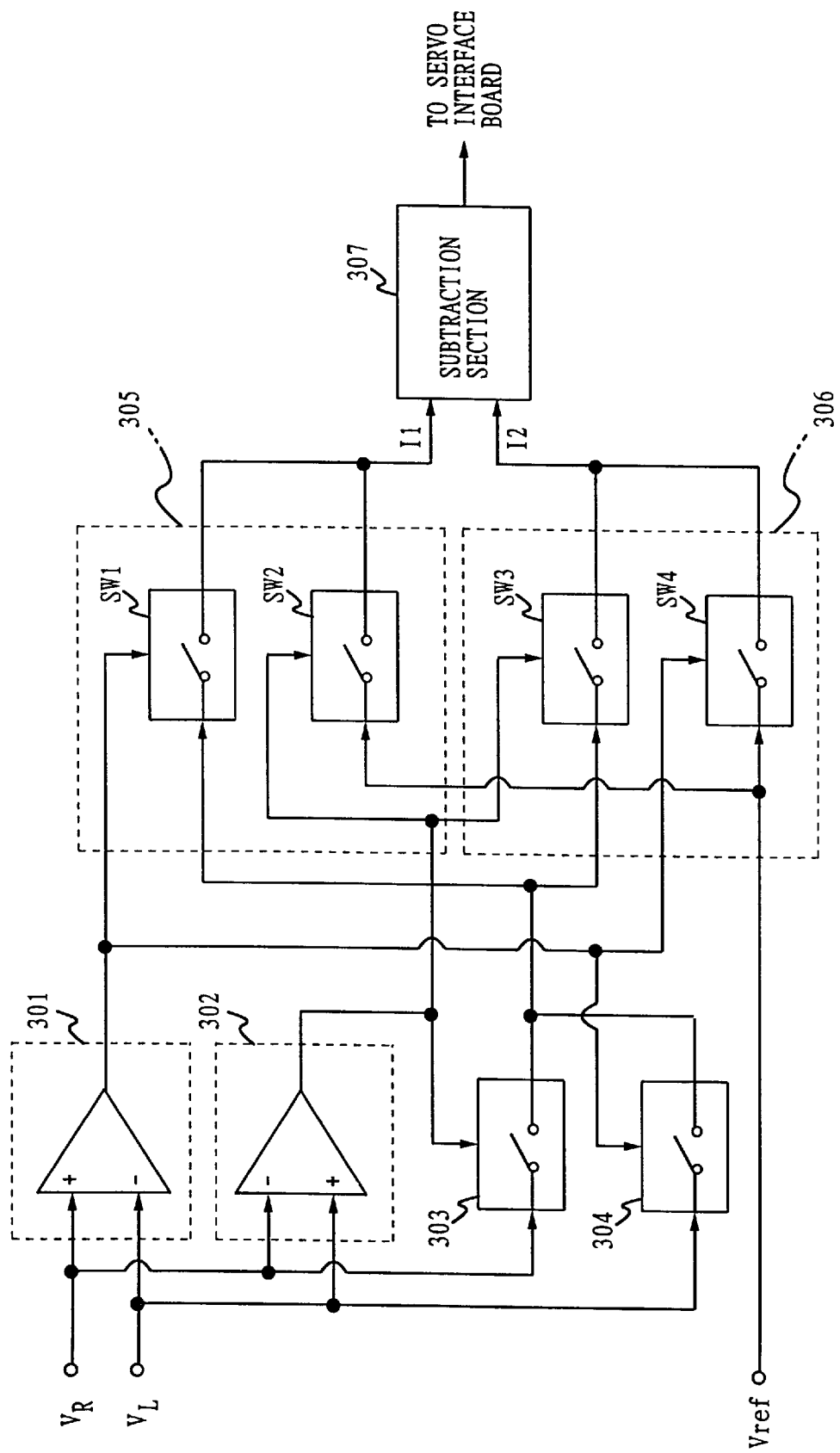
FIG. 3 is a schematic circuit diagram of a tracking control circuit for an electromagnetic induction type AGV according to the present invention.

FIG. 3 is a schematic circuit diagram of the tracking control circuit for an AGV according to the present invention.

Referring to FIG. 3, a first comparing section 301 comprises a comparator OP1 for comparing a first induced voltage $V_R$ provided from a sensor equipped on a right side of a buried cable with a second induced voltage $V_L$ provided from a sensor equipped on a left side of the buried cable, and outputting a corresponding switching control signal if the first induced voltage $V_R$ is higher than the second induced voltage $V_L$. A second comparing section 302 comprises a comparator OP2 for comparing the first induced voltage $V_R$ with the second induced voltage $V_L$, and outputting a corresponding switching control signal if the first induced voltage $V_R$ is lower than the second induced voltage $V_L$.

First and second switching sections 303 and 304 each comprise an analog switch for being switched by the switching control signals outputted from the first and second comparing sections 302 and 301, respectively. The first induced voltage $V_R$ is transmitted via first switching section 303 to third and fourth switching sections 305, 306 upon switching by the control signal outputted by comparing section 302. The second induced voltage $V_L$ is transmitted via second switching section 304 to third and fourth switching sections 305, 306 upon switching by the control signal outputted by comparing section 301.

Third switching section 305 comprises a plurality of analog switches SW1 and SW2, which are switched in accordance with the switching control signals outputted from the first and second comparing sections 301 and 302, respectively. Fourth switching section 306 comprises a plurality of analog switches SW3 and SW4, which are switched in accordance with the switching control signals outputted from the second and first comparing sections 301 and 302, respectively. The third and fourth switching sections 305, 306 each select one of the voltages outputted from the first and second switching sections 303, 304 and a predetermined reference voltage Vref.

A subtraction section 307 comprises a subtractor for subtracting the voltage I2, which is selected by and outputted from the fourth switching section 306, from the voltage I1, which is selected by and outputted from the third switching sections 305, to thereby output a tracking control signal.

An explanation of the operation of the tracking control circuit described above follows.

The first induced voltage $V_R$, provided from the sensor 2 (induction coil) equipped on the right side of the buried cable 1, is input to the terminal labeled $V_R$ in FIG. 3. The second induced voltage $V_L$, provided from the sensor 2 (induction coil) equipped on the left side of the buried cable 1, is input to the terminal labeled $V_L$. The reference voltage Vref, which corresponds to a voltage which can be induced between the buried cable and the induction coil sensors, is input to the input terminal labeled Vref in FIG. 3.

For example, since the first induced voltage $V_R$ becomes higher than the second induced voltage $V_L$, if the tracking of the AGV veers to the left side, the level of the switching control signal outputted from the comparator OP1 in the first comparing sections 301 becomes 'high'. As a result, the second switching section 304 is turned on as well as the analog switches SW1 and SW4 of the third and fourth switching sections 305 and 306.

If the second switching section 304 is turned on, the second induced voltage $V_L$ applied to the input terminal $V_L$ is inputted to an input terminal of the substraction section 307 through the second switching section 304 and the analog switch SW1 of the third switching section 305. Concurrently, the reference voltage Vref applied to the input terminal Vref is inputted to the other input terminal of the substraction section 307 through the analog switch SW4 of the fourth switching section 306. Thus, the voltage outputted from the substraction section 307, which will be Vref−$V_L$, is provided to a servo interface board.

On the other hand, if the first induced voltage $V_R$ is lower than the second induced voltage $V_L$, that is, if the tracking of the AGV veers to the right side, the level of the switching control signal outputted from the second comparator OP2 of the second comparing section 302 becomes 'high'. Accordingly, the first switching section 303 is turned on as well as the analog switches SW2 and SW3 of the third and fourth switching sections 305 and 306.

If the first switching section 303 is turned on, the first induced voltage $V_R$ applied to the input terminal $V_R$ is inputted to an input terminal of the substraction section 307 through the first switching section 303 and the analog switch SW3 of the third switching sections 305. Concurrently, the reference voltage Vref applied to the input terminal Vref is applied to the other input terminal of the substraction section 307 through the analog switch SW4 of the third switching section 305. Thus, the voltage outputted from the substraction section 307, which will be $V_R$−Vref, is provided to the servo interface board.

The substraction section 307 subtracts the signal I2 outputted from the fourth switching section 306 from the signal I1 outputted from the third switching section 305. Therefore, if the voltage $V_L$ is lower than the voltage $V_R$, the subtracted voltage of $V_L$−Vref is provided to the servo interface board (not illustrated) to control the tracking of the AGV when it has veered to the left with respect to the buried cable. If the voltage $V_R$ is lower than the voltage $V_L$, the subtracted voltage of Vref−$V_R$ is provided to the servo interface board to control the tracking of the AGV when it has veered to the right with respect to the buried cable.

Figure 4:
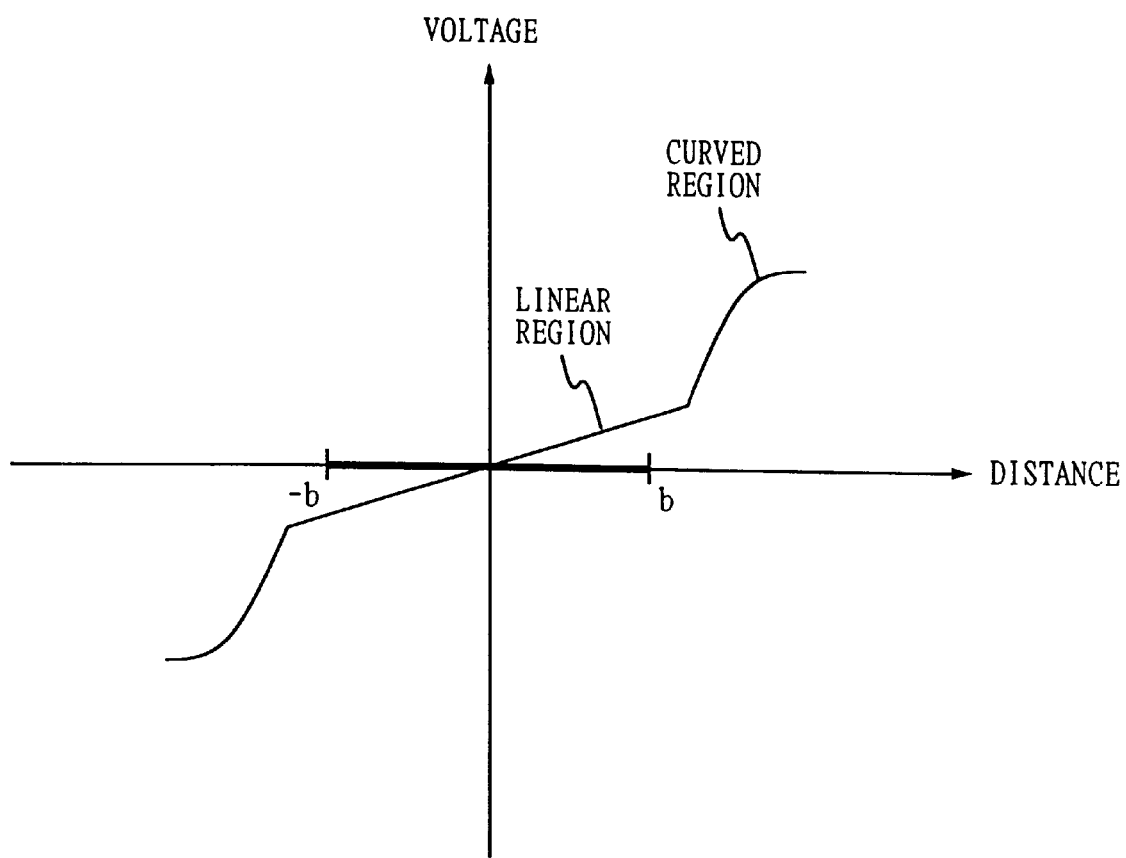
FIG. 4 is a view illustrating the output characteristics of the tracking control circuit of FIG. 3.

When tracking control is performed with respect to very small errors, vibrations may be produced in the AGV which may cause instability. Therefore, as shown in FIG. 4, the tracking is controlled in such a manner that, within a predetermined error-allowable range from "b" to "−b", no tracking control output is required. This is shown by the virtually flat "linear region" of the characteristic shown in FIG. 4. The tracking control is performed only when the movement distance of the sensors 2 with respect to the cable 1 exceeds the error-allowable distance "b" so that the induced voltage is characterized in correspondence to the distance between the cable 1 and the sensors 2. This is shown as the "curved regions" of the characteristic shown in FIG. 4, where the veering distance is beyond the error-allowable range.

The reference voltage Vref should be predetermined so as to produce an output characteristic as shown FIG. 4, the. The portion of the curved region to the right of the voltage axis is produced by the subtraction of a sensed induction voltage from Vref. On the other hand, the portion of the curved region to the left of the voltage axis is produced by subtraction of Vref from a sensed induction voltage. Thus, proper selection of Vref yields the appropriate output characteristic. Of course, the appropriate Vref level varies depending upon the physical configuration of the sensors with respect to the buried cable, and may be easily determined by empirical measurement of the system in which the tracking control circuit is to be used.

As described above, according to the present invention, the tracking error of the AGV which may be produced during the driving of the AGV is stably and rapidly compensated for without using a central processing unit (CPU). Further, when compensating for the tracking error, the tracking control is performed only beyond a predetermined margin, thereby preventing vibration from being generated in the AGV.

In the drawings and the above description, typical preferred embodiments of the invention have been disclosed.

Although specific terms are employed, they are used in a generic and descriptive sense only and not for purposes of limitation, the scope of the invention being set forth in the following claims. It will be appreciated that various modifications may be made with respect to the described embodiments without departing from the spirit and scope of the invention.

What is claimed is:

1. A tracking control circuit for use in an automatic guide vehicle (AGV) to control the tracking of the AGV using sensors, the sensors being equipped in the right and left sides of the AGV to straddle a buried cable, the sensors sensing voltages induced from the buried cable when the AGV is being driven, the tracking control circuit comprising:

a first comparing means for comparing a first induced voltage provided from one of the sensors equipped in the left side of the AGV with a second induced voltage provided from one of the sensors equipped in the right side of the AGV, and for outputting a first switching control signal if said first induced voltage is higher than said second induced voltage;

a second comparing means for comparing said first induced voltage with said second induced voltage, and for outputting a second switching control signal if said first induced voltage is lower than said second induced voltage;

first switching means for being switched by said second switching control signal to transmit said first induced voltage therethrough;

second switching means for being switched by said first switching control signal to transmit said second induced voltage therethrough;

third switching means for selecting, in accordance with said first and second switching control signals, either the voltage transmitted through one of said first and second switching means or a predetermined reference voltage;

fourth switching means for selecting, in accordance with said first and second switching control signals, either the voltage transmitted through one of said first and second switching means or said predetermined reference voltage; and subtraction means for subtracting the voltage selected by said fourth switching means from the voltage selected by said third switching means to provide a tracking control signal.

2. The tracking control circuit as claimed in claim 1, wherein said first comparing means comprises a comparator for comparing said first induced voltage with said second induced voltage, and outputting said first switching control signal if said first induced voltage is higher than said second induced voltage.

3. The tracking control circuit as claimed in claim 1, wherein said second comparing means comprises a comparator for comparing said first induced voltage with said second induced voltage, and outputting said second switching control signal if said first induced voltage is lower than said second induced voltage.

4. The tracking control circuit as claimed in claim 1, wherein said first switching means comprises an analog switch for being switched by said second switching control signal to provide said first induced voltage to said third and fourth switching means.

5. The tracking control circuit as claimed in claim 1, wherein said second switching means comprises an analog switch for being switched by said first switching control signal to provide said second induced voltage to said third and fourth switching means.

6. The tracking control circuit as claimed in claim 1, wherein said third switching means comprises a plurality of analog switches for being switched in accordance with said first and second switching control signals to select either the voltage transmitted through one of said first and second switching means or said reference voltage.

7. The tracking control circuit as claimed in claim 1, wherein said subtraction means comprises a subtractor for subtracting said voltage selected by said fourth switching means from said voltage selected by said third switching means to provide said tracking control signal.

8. The tracking control circuit as claimed in claim 1, wherein said fourth switching means comprises a plurality of analog switches for being switched in accordance with said first and second switching control signals to select the voltage transmitted through one of said first and second switching means or said reference voltage.

9. The tracking control circuit as claimed in claim 1, wherein said third switching means comprises a plurality of analog switches for being switched in accordance with said first and second switching control signals to select either the second induced voltage transmitted through said second switching means or said reference voltage.

10. The tracking control circuit as claimed in claim 1, wherein said fourth switching means comprises a plurality of analog switches for being switched in accordance with said first and second switching control signals to select either the first induced voltage transmitted through said first switching means or said reference voltage.

11. A tracking control method for use in an automatic guide vehicle (AGV) to control the tracking of the AGV using sensors, the sensors being equipped in the right and left sides of the AGV to straddle a buried cable, the sensors sensing voltages induced from the buried cable when the AGV is being driven, the tracking control method comprising the steps of:

(a) comparing a first induced voltage provided from one of the sensors equipped in the left side of the AGV with a second induced voltage provided from one of the sensors equipped in the right side of the AGV to output a first switching control signal if said first induced voltage is higher than said second induced voltage;

(b) comparing said first induced voltage with said second induced voltage to output a second switching control signal if said first induced voltage is lower than said second induced voltage;

(c) switching a first switch based upon said second switching control signal to transmit said first induced voltage through said first switch;

(d) switching a second switch based upon said first switching control signal to transmit said second induced voltage through said second switch;

(e) selecting, in accordance with said first and second switching control signals, either the second induced voltage transmitted through said second switching means or a predetermined reference voltage;

(f) selecting, in accordance with said first and second switching control signals, either the first induced voltage transmitted through said first switching means or said predetermined reference voltage; and (g) subtracting the voltage selected in said step (f) from the voltage selected in said step (e) to provide a tracking control signal.

12. A tracking control circuit for use in an automatic guide vehicle (AGV) to control the tracking of the AGV using sensors, the sensors being equipped in the right and left sides of the AGV to straddle a buried cable, the sensors sensing voltages induced from the buried cable when the AGV is being driven, the tracking control circuit comprising:

a first comparator having plural inputs and an output, said first comparator receiving a first induced voltage provided from one of the sensors equipped in the left side of the AGV at one of its plural inputs and receiving a second induced voltage provided from one of the sensors equipped in the right side of the AGV at another of its plural inputs, said comparator producing a first switching control signal at its output if said first induced voltage is higher than said second induced voltage;

a second comparator having plural inputs and an output, said second comparator receiving said first induced voltage at one of its plural inputs and receiving said second induced voltage at another of its plural inputs, said comparator producing a second switching control signal at its output if said first induced voltage is lower than said second induced voltage;

first switch having an input connected to receive said first induced voltage, a first gate electrode connected to the output of said second comparator, and an output at which said first induced voltage is produced when said second switching control signal is received at said first gate electrode to switch said first switch;

second switch having an input connected to receive said second induced voltage, a second gate electrode connected to the output of said first comparator, and an output at which said second induced voltage is produced when said first switching control signal is received at said second gate electrode to switch said second switch;

first selector having plural inputs and an output, said first selector having the outputs of each of said first and second switches connected to one of its plural inputs and a predetermined reference voltage provided at another of its plural inputs, said output of the first selector providing either the voltage produced at the outputs of said first and second switches or said predetermined reference voltage in accordance with said first and second switching control signals;

second selector having plural inputs and an output, said second selector having the outputs of each of said first and second switches connected to one of its plural inputs and said predetermined reference voltage provided at another of its plural inputs, said output of the second selector providing either the voltage produced at the outputs of said first and second switches or said predetermined reference voltage in accordance with said first and second switching control signals; and subtractor which produces as an output a tracking control signal by subtracting the voltage selected by said second selector from the voltage selected by said first selector.

13. The tracking control circuit as claimed in claim 12, wherein said first switch and said second switch are analog switches.

14. The tracking control circuit as claimed in claim 12, wherein said first selector comprises a pair of analog switches, one of said pair of analog switches being responsive to said first switching signal to transmit the voltage produced at the outputs of said first and second switches to the output of said first selector, and the other of said pair of analog switches being responsive to said second switching signal to transmit said predetermined reference voltage to the output of said first selector.

15. The tracking control circuit as claimed in claim 12, wherein said second selector comprises a pair of analog switches, one of said pair of analog switches being responsive to said second switching signal to transmit the voltage produced at the outputs of said first and second switches to the output of said second selector, and the other of said pair of analog switches being responsive to said first switching signal to transmit said predetermined reference voltage to the output of said second selector.

* * * * *